July 29, 1952 D. M. HANSING 2,605,369
CONTACT DEVICE
Filed March 3, 1950

Inventor
David M. Hansing.
By Elmer Aiken
Attorney.

Patented July 29, 1952

2,605,369

UNITED STATES PATENT OFFICE 2,605,369

CONTACT DEVICE

David M. Hansing, Vasteras, Sweden, assignor to Allmanna Svenska Elektriska Aktiebolaget, Vasteras, Sweden, a corporation of Sweden Application March 3, 1950, Serial No. 147,394
In Sweden March 26, 1949

7 Claims. (Cl. 200—38)

The present invention relates to a contact making device which may be used for instance as impulse transmitting instrument in combination with maximum demand regulators, i. e. as comparison impulse transmitter, the adjustment of which corresponds to the previously declared maximum demand.

The apparatus comprises substantially a driving motor, a gear and a plurality of mechanical change gears, and a means for continuous adjustment of the intervals between successive contacts.

One object of the present invention is the construction of said means for continuous adjustment of the contact intervals. This means consists substantially of an endless elastic belt supporting driver rings. The belt runs over two belt pulleys, one of which is driven by the motor and rotates about a stationary axis while the other rotates freely with an axis which is adapted to be displaced with respect to the stationary axis. By changing the distance between the belt pulleys, the length of the belt may be altered continuously, whereby the contact intervals may be varied arbitrarily. In order to enable the contact intervals to be varied within larger steps, the device has the above mentioned mechanical change gears.

Figure 1:
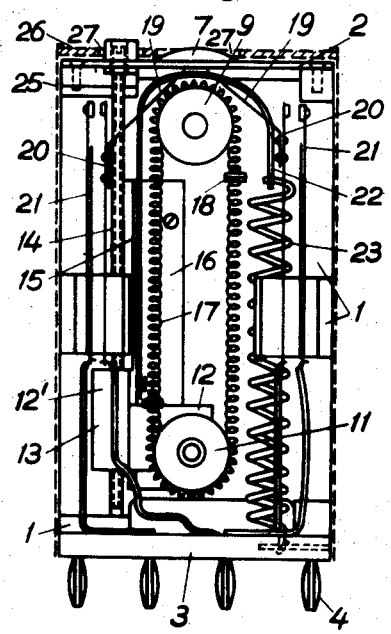
Figure 2:
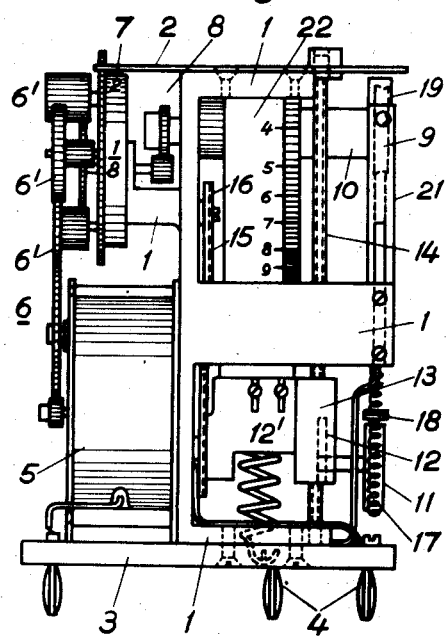
Figure 3:
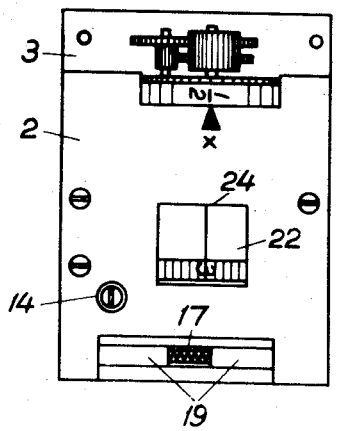
Figure 4:
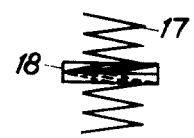

The invention will be described reference being made to the accompanying drawing, wherein Fig. 1 is a front view of the contact device, Fig. 2 is a side view, Fig. 3 is a top view, and Fig. 4 shows the fixing of the driver rings on the belt in considerably enlarged scale.

Referring to the drawing, 1 is a frame-work, 2 a top plate, 3 a connection plate having plug contacts 4, preferably so called banana contacts. By 5 is designated a driving motor, preferably a synchronous motor, by 6 generally a gear with interchangeable pinions 6' which are journalled on a calibrated turntable disc 7. By the rotation of the disc, the ratio of gear can be varied within a range of 1:2, 1:4, 1:8, for instance. Driven through a gear 8 is a belt pulley 9, the shaft of which is carried through a hub 10 within the frame-work 1.

Another belt pulley 11 is journalled by means of a ball bearing on a fixed shaft, which is fixed on a plate 12, which in turn is secured on a travelling nut 13. As seen from Figs. 1 and 2, the travelling nut may be raised and lowered by means of a guide screw 14 pivoted in the top and bottom of the frame-work, for instance by rotating it by means of a screw driver inserted in a slot on the uppermost part of the guide screw 14. Fixed on the travelling nut 13, rectangularly to the plate 12, is a cross plate 12'. One edge of the cross plate 12' is guided within a guide slot 15 provided in a bar 16, enabling the belt pulley 11 to move downwards and upwards therewithin.

On the belt pulleys 9 and 11, there is placed an endless elastic belt 17 having the form of a helical spring which supports drivers 18. Each driver comprises for instance two small rings laid together and having gaps made parallel with the pitch of the spring 17. Two adjacent winding portions of the spring are clamped and soldered between the gap formed by this way. The arrangement is illustrated in Fig. 4 in a larger scale. This method of fixing the drivers has proved especially reliable and durable.

When the drivers are moved along the laminae 19 on the contact springs 20 arranged on both sides of the pulley 9, their contacts engage countercontacts on contact springs 21. The contact springs 20 and 21 have connected to them conductors leading to plug contacts on the connection plate 3, which also supports the terminals for the motor.

In order to enable checking of the distance adjusted between the pulleys 9 and 11, there is an indicating means which consists, in the embodiment shown by way of example, of a steel ribbon 22, provided with a scale, one end of which ribbon is secured to the cross plate 12', while its other end is hung up in a drawspring 23. The ribbon runs over the hub 10. On the top plate 2, there is a mark X for reading the position of the change gear disc 7, and a window 24 for reading, from the calibrated ribbon, the distance between the belt pulleys, the value of said distance—if desired converted by a constant—thus indicating the adjusted comparison magnitude, for instance the previously declared power in the use of a so called maximum demand regulator, which controls the contracted power supplied from a power station.

The contact device is covered by a casing having a window-pane provided with openings for the operation of the screw bolt 14 and the pulley 7. The casing 25, the window-pane 26 and the openings 27 are indicated on Fig. 1 by dotted lines.

I claim as my invention:

1. A contact device for the adjustment of contact intervals, having a driving motor and variable mechanical driving gears, and comprising a belt pulley driven by the motor and rotating about a stationary axis, an idle pulley rotating about an axis displaceable with respect to said stationary axis, an endless elastic belt on said pulleys, driver means carried by said belt, contact means operated by said driver means, and means for adjusting the distance between the axes of said pulleys to alter the length of the said belt.

2. A contact device according to claim 1, wherein the elastic belt consists of a helical metal spring.

3. A contact device for the adjustment of contact intervals, having a driving motor and variable mechanical driving gears, and comprising a belt pulley driven by the motor and rotating about a stationary axis, an idle pulley rotating about an axis displaceable with respect to said stationary axis, an elastic belt on said pulleys, a plurality of driver means spaced from each other and carried by said belt, contact means operated by said driver means, and means for changing the distance between said pulleys to alter the spaced relationship of said driver means on said belt.

4. A contact device comprising a belt pulley rotating about a stationary axis, a hub carrying said pulley, a synchronous motor, change gear mechanism transmitting rotary motion from said motor to said pulley, a belt pulley rotating about a movable axis, means for the gradual adjustment of the distance between said movable axis and the said stationary axis including a guide slot and screw and nut mechanism, and a flexible belt capable of stretching and contracting to conform to the increase and decrease of the distance between the said pulleys and transmitting rotary motion from the first-mentioned to the second-mentioned pulley.

5. A contact device according to claim 4, comprising indicating means, actuated by said means for the adjustment of said movable axis, said indicating means indicating the distance between the two pulleys and comprising a calibrated ribbon having one end secured to said adjusting means, and a spring connected to the other end of said ribbon and causing the ribbon to be drawn over the said hub in accordance with the movement of the movable axis.

6. A contact device with means for the gradual adjustment of contact intervals comprising a driving motor, a belt pulley with a stationary axis, change gear mechanism for transmitting motion from the motor to said pulley, a belt pulley mounted on an axis movable with respect to the axis of the first pulley, means for the gradual adjustment of the axis of the second pulley to vary the distance between said pulleys, a helical endless spring mounted on said pulleys, drivers on said spring, said drivers consisting of rings cut in parallel to the pitch of the windings of the said spring, and adjacent winding portions of the spring being clamped between the gaps in the drivers, and contact means operated by said drivers.

7. A contact device according to claim 6, comprising a connection plate, plug contacts projecting from said plate and connected with the terminals of the motor and the terminals of said contact means, and a casing having openings therein permitting access to the change gear means and to the means for the adjustment of the distance between the pulleys.

DAVID M. HANSING.

REFERENCES CITED

The following references are of record in the file of this patent:

UNITED STATES PATENTS

| Number | Name | Date |
|---|---|---|
| 1,964,909 | Garity | July 3, 1934 |
| 2,382,052 | Gray | Aug. 14, 1945 |
| 2,495,462 | Lassiter | Jan. 24, 1950 |